United States Patent
Schuster

[11] Patent Number: 5,549,130
[45] Date of Patent: Aug. 27, 1996

[54] GAS APPLIANCE UPSET SHUTOFF VALVE

[75] Inventor: Yoel Schuster, Holon, Israel

[73] Assignee: Gas Guard West, Inc., Oakland, Calif.

[21] Appl. No.: 395,070

[22] Filed: Feb. 27, 1995

[51] Int. Cl.⁶ ............................................... F16K 17/36
[52] U.S. Cl. ................................... 137/39; 251/149.4
[58] Field of Search .................... 137/38, 39; 251/149.4, 251/149.6

[56] References Cited

U.S. PATENT DOCUMENTS

| | | | |
|---|---|---|---|
| 3,407,827 | 10/1968 | Follett | 137/39 |
| 3,731,718 | 5/1973 | Gramig | 251/149.4 X |
| 3,850,189 | 11/1974 | Follett | 137/39 |
| 4,155,374 | 5/1979 | Diehl | 137/519.5 |
| 4,380,428 | 4/1983 | Rozzi | 137/38 X |
| 5,209,252 | 5/1993 | Perle | 137/38 |
| 5,240,025 | 8/1993 | Morris | 137/38 |

Primary Examiner—Stephen M. Hepperle
Attorney, Agent, or Firm—Howard Cohen

[57] ABSTRACT

A shutoff valve for a portable gas appliance to detect an upset or inverted disposition of the appliance and immediately stop all gas flow includes a valve body having an inlet port that is threaded to be secured directly to a compressed gas tank, and a stem extending outwardly therefrom to actuate the safety valve typically provided in the tank outlet. An internal bore extends within the valve body and includes a proximal end that joins the inlet port in generally coaxial fashion. The internal bore is adapted to be oriented preferably in an upright attitude. At the distal end of the bore a threaded female receptacle is formed. An O-ring seal concentrically within a medial portion of the bore, and a valve ball is translatably retained between the O-ring seal and the valve stem. If the appliance becomes upset or overturned, the valve ball will be driven gravitally to roll toward the O-ring seal. The ball will seat in the opening of the O-ring, blocking the flow path completely and shutting off all gas flow through the valve. A reset mechanism extends into the valve body to intersect a medial portion of the internal bore adjacent to the O-ring seal. The valve may be restored to operating condition by pushing a reset spindle inwardly, a pin at the inner end of the spindle contacting the valve ball and pushing the ball out of its seat in the O-ring seal.

13 Claims, 3 Drawing Sheets

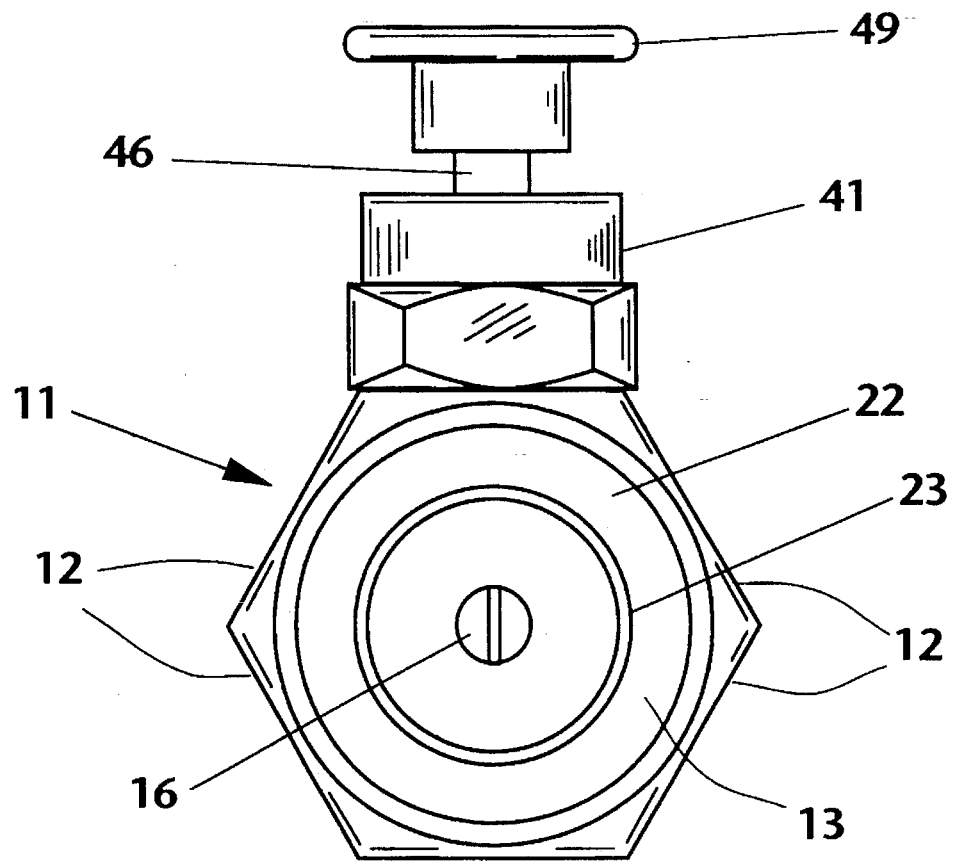
Figure_1
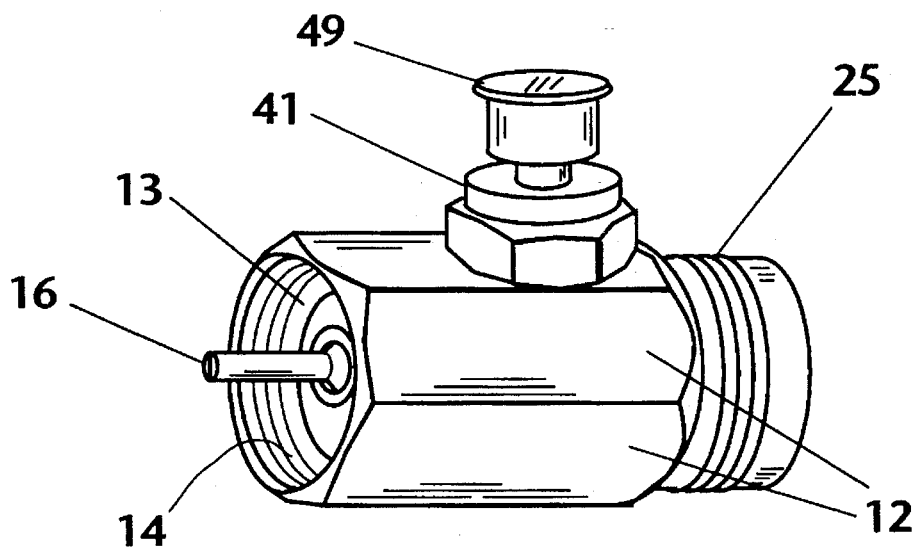
Figure_2

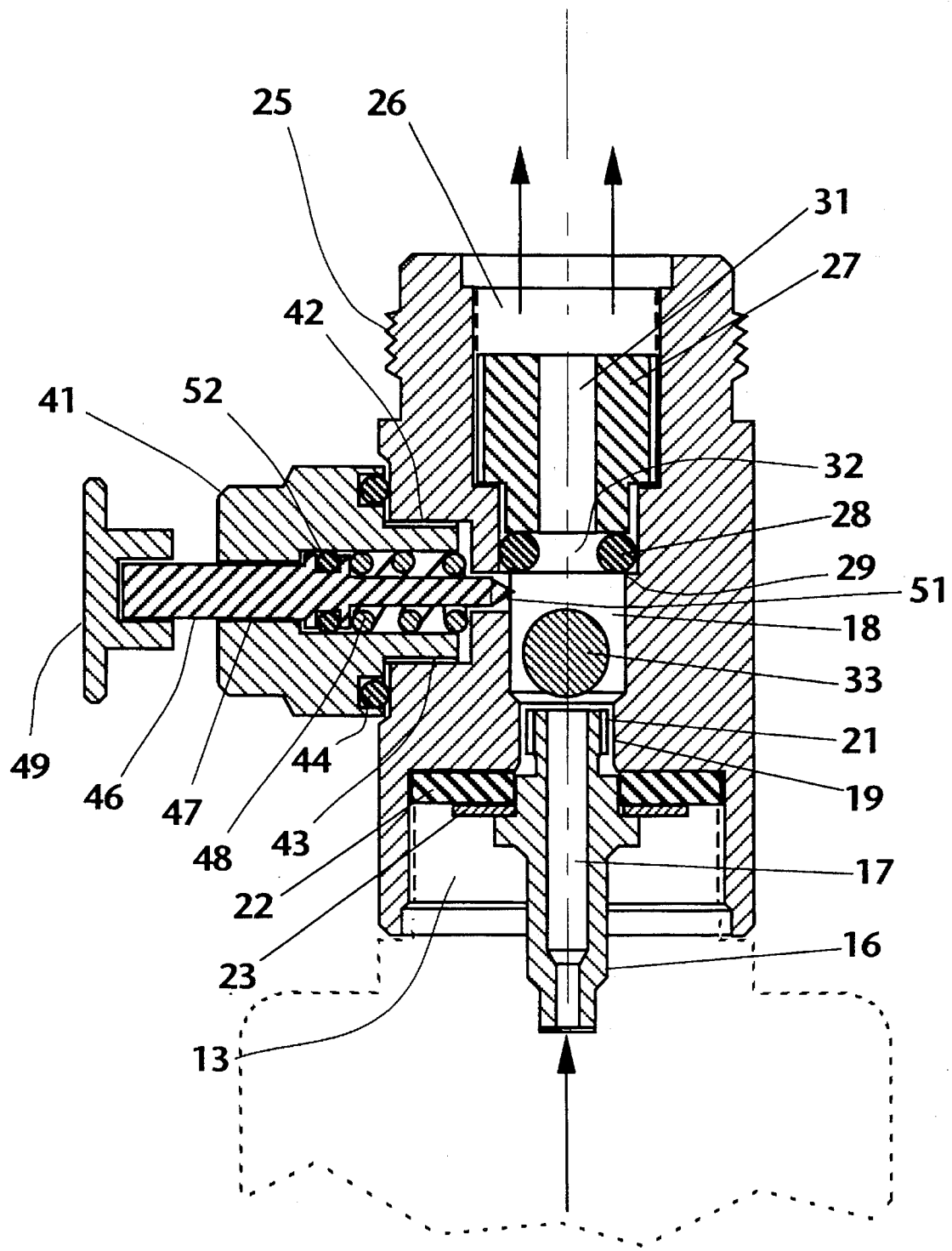
Figure_3

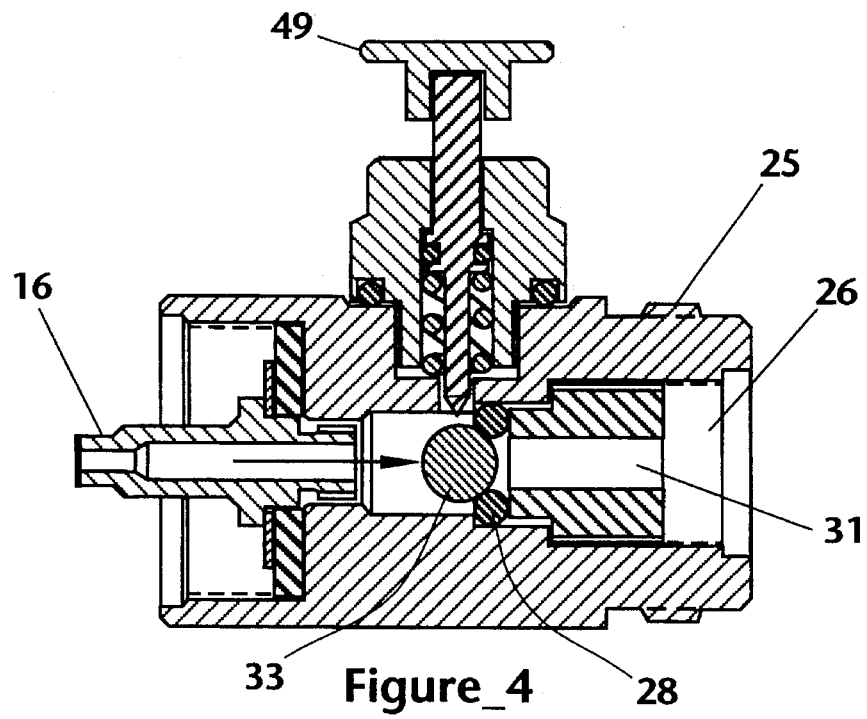
Figure_4
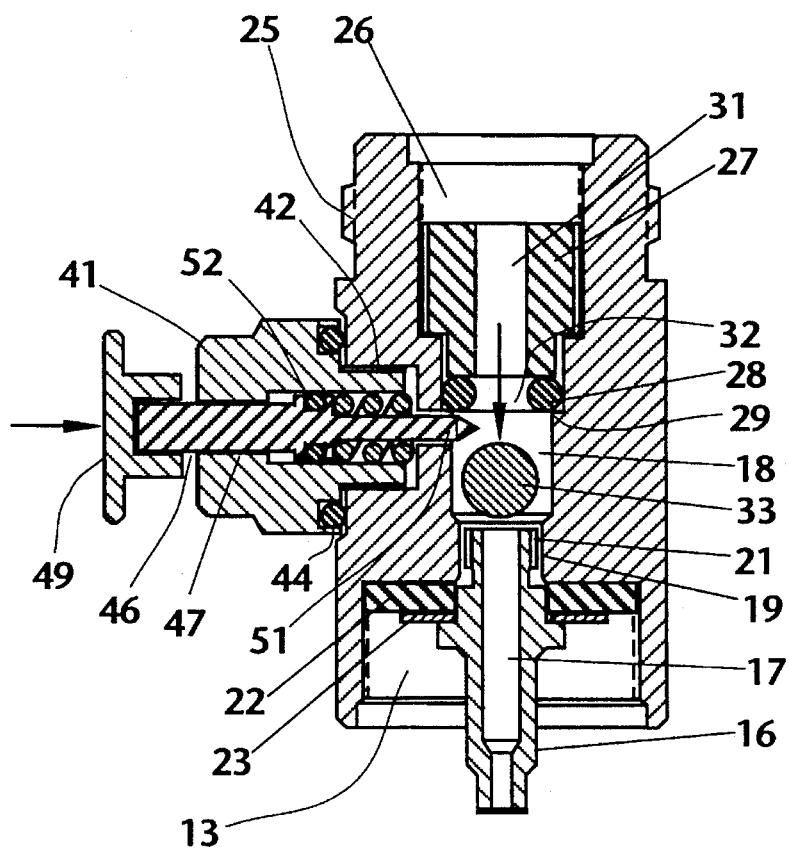
Figure_5

GAS APPLIANCE UPSET SHUTOFF VALVE

BACKGROUND OF THE INVENTION

The present invention generally relates to gas flow control valves, and more particularly to gas valves for portable gas appliances and the like.

There is known in the prior art a wide variety and great number of portable gas-fired appliances. These devices generally rely on relatively small tanks of compressed or liquified fuel gas, such as propane, butane, natural gas, or combinations thereof. This type of energy supply is superior in energy storage density, heat output and temperature control, portability, and convenience. In many localities and in most parts of the world, portable, gas-fired appliances are the primary mechanisms for cooking and heating. Even in developed areas where installed natural gas service is available, portable gas appliances are in widespread use, primarily for recreational purposes. Such gas appliances include cooking stoves, space heaters, lanterns, and the like. Many recreational vehicles, such as power boats and sail boats, camping vans and trailers include portable gas appliances.

Despite the significant convenience factor exhibited by portable gas devices, there is also a serious safety issue. Almost all portable gas appliances are designed to be operated in an upright orientation (i.e., the flame jets venting upwardly), but by the very nature of their portability they are capable of being upset rather easily. That is, these devices may easily be accidentally dropped, upset, or turned over, or other objects may drop or fall onto these devices. There is the potential for any such action to cause a break or leak, releasing a flammable and explosive gas which may be ignited accidentally to cause a catastrophe. Moreover, if the device is in operation when such action occurs, there is a great risk of the hot gas flame igniting any nearby object and creating a very destructive, fuel-fed fire. Likewise, the hot gas flame may burn any nearby individual. If the device falls into an orientation in which the flame output is beneath the compressed gas canister, there is the potential for a disastrous canister explosion.

There is a need in the prior art to address this safety issue and prevent the accidental destruction and injury caused by such accidents caused by operation of portable gas appliances. The prior art is deficient in devices to limit or eliminate these types of accidents.

SUMMARY OF THE PRESENT INVENTION

The present invention generally comprises a shutoff valve for a portable gas appliance that detects an upset or inverted disposition of the appliance and immediately stops all gas flow from the compressed gas cylinder that supplies the appliance. Thus the shutoff valve prevents release of flammable and explosive gas from any leak that is engendered by the upset or inverted condition, whether or not the appliance is in operation. Likewise, if the appliance is in use, the shutoff valve will detect the upset or inverted condition and shutoff the flame before it can initiate burning of any adjacent object.

The upset sensing shutoff valve includes a valve body provided with an inlet port that is threaded to be secured directly to the standard outlet of a compressed gas tank, and includes a stem extending axially outwardly therefrom to actuate the safety valve typically provided in the tank outlet opening. An internal bore extends within the valve body and includes a proximal end that joins the inlet port in generally coaxial fashion. The internal bore is adapted to be oriented generally non-horizontally, and preferably in an upright attitude. At the distal end of the bore a threaded female receptacle is formed. A sleeve is secured at the inner end of the receptacle, and is disposed to retain an O-ring seal concentrically within a medial portion of the bore. A valve ball is translatably disposed within the bore, the ball having a diameter greater than the opening of the O-ring seal and being retained between the O-ring seal and the valve stem. An outer threaded portion is provided at the distal end of the valve body to secure the valve to a pressure regulator and/or gas supply line of an appliance.

A flow path is established from the valve stem at the inlet port to the internal bore, past the valve bore and O-ring seal, and thence through the sleeve to the outlet port of the female receptacle. With the valve body disposed so that the internal bore extends generally upwardly from the inlet port to the outlet port, gas flow proceeds unimpeded and operation of the gas appliance takes place in normal fashion. However, if the appliance becomes upset, tipped, or overturned while gas is flowing through the shutoff valve, the valve ball will be driven gravitally to roll toward the O-ring seal. Gas flow through the bore will urge the ball to seat in the opening of the O-ring, blocking the flow path completely and shutting off all gas flow through the valve. The valve ball will generally remain seated in the O-ring seal as long as upstream pressure is applied.

The shutoff valve further includes a reset mechanism to restore operation of the appliance after the valve has been actuated by an upset, overturn, or tipped condition. The reset mechanism includes a tapped opening extending in the valve body to intersect a medial portion of the internal bore adjacent to the O-ring seal. A reset housing includes an externally threaded end secured in the tapped opening, and an annular seal impinging on the valve body to prevent gas outflow. A reset spindle is translatably disposed in a spindle bore extending through the housing. A compression spring is disposed about the spindle to bias the reset mechanism to translate outwardly from the valve body, and the outer portion of the spindle is provided with a button end. The inner end of the spindle includes a pin extending therefrom and adapted to translate inwardly and impinge on the valve ball when it is seated in the O-ring seal.

In normal operating conditions, gas flows from the inlet port past the valve ball and out through the outlet port, as described above. The valve ball is quiescent within the vertically disposed medial bore portion, generally resting at the inner end of the valve stem of the inlet port. When the appliance becomes upset, tipped, inverted or otherwise overturned, the valve ball will be driven gravitally to roll toward the O-ring seal. If this occurs while gas is flowing through the shutoff valve (i.e., if the gas appliance is in operation or if the event causes a leak in the appliance) the bore will urge the ball to seat in the opening of the O-ring, blocking the flow path completely and shutting off all gas flow through the valve. The valve ball will generally remain seated in the O-ring seal as long as upstream pressure is applied. Thus an upset caused leak will be stopped immediately, or the appliance flame will be stopped immediately, before it can ignite any nearby materials.

When the upset condition is rectified, the valve may be restored to operating condition by use of the reset mechanism. The outer button is pushed manually against the force of the spring to drive the spindle pin inwardly, the pin contacting the valve ball and pushing the ball out of its seat in the O-ring seal. The button is released, and the spring translates the spindle outwardly to its quiescent position.

It may be noted that the clearance between the valve ball and the internal bore in which it resides is sufficient to provide no significant impediment to gas flow through the valve. The valve is actuated only in the event of upset, inversion, or severe tipping of the gas appliance.

BRIEF DESCRIPTION OF THE DRAWING

FIG. 1 is an inlet end view of the upset sensing gas shutoff valve of the present invention.

FIG. 2 is a perspective view of the upset sensing gas shutoff valve shown in FIG. 1.

FIG. 3 is a cross-sectional view of the upset sensing gas shutoff valve, shown in its normal upright operating disposition.

FIG. 4 is a cross-sectional view of the upset sensing gas shutoff valve, shown in a tipped, shutoff disposition.

FIG. 5 is a cross-sectional view of the upset sensing gas shutoff valve, shown in its normal upright operating disposition with the reset mechanism actuated to restore gas flow through the valve.

DESCRIPTION OF THE PREFERRED EMBODIMENT

The present invention generally comprises a shutoff valve for a portable gas appliance that responds to an upset, tipped, or inverted disposition of the appliance and immediately stops all gas flow from the compressed gas cylinder that supplies the appliance. The valve is designed to stop all gas flow therethrough whether or not the appliance is in use.

With regard to FIGS. 1–3, the shutoff valve includes a valve body 11 having an outer configuration of hex sides 12 extending parallel to the longitudinal axis of the valve body 11. At a proximal end of the valve body an inlet port 13 is formed symmetrically with the axis of the valve body. The inlet port 13 comprises a female receptacle having internal threads 14, and is dimensioned to engage a standard outlet configuration of a compressed gas cylinder or tank. A valve stem 16 extends proximally and axially from the inner end of the port 13 to engage and release the outlet valve of a typical compressed gas tank outlet port, as is known and established in the prior art. A stepped internal bore 18 extends axially through the valve body, and includes a proximal threaded portion 19 opening to the inlet port 13. An inner tapped end 21 of the valve stem 16 is secured in the portion 19 of the bore, and a gasket and washer combination 22 and 23 seals the valve stem in the body as well as sealing the compressed gas tank outlet within the port 13. The valve stem includes a central passage 17 to permit gas flow from the gas tank into the bore 18.

At the distal end of the bore 18 a threaded female receptacle 26 is formed. A threaded sleeve 27 is secured in the receptacle 26, and an O-ring seal 28 is retained between the inner end of the sleeve 27 and an annular shoulder 29 of the bore 18. The sleeve 27 includes a central passage 31 extending axially therethrough which communicates with the opening 32 of the seal 28. An outer threaded portion 25 is provided at the distal end of the valve body to secure the valve to a pressure regulator and/or gas supply line of a gas-consuming appliance.

A valve ball 33 is disposed within the bore in the space defined between the O-ring seal 28 and the inner end of the valve stem 16. The ball diameter is greater than the diameters of both the O-ring opening 32 and the passage 17, so that it is retained therebetween, and is less than the diameter of the bore 18, so that it translates freely therein. Moreover, the clearance between the valve ball 33 and the bore 18 is sufficient to permit ample gas flow therebetween to meet the requirements of virtually any gas appliance.

The shutoff valve further includes a reset mechanism to restore operation of the appliance after the valve has been actuated by an upset, overturn, or tipped condition. The reset mechanism includes a tapped opening 42 extending in the valve body 11 to intersect a medial portion of the internal bore 18 adjacent to the O-ring seal 28. A reset housing 41 includes an externally threaded end 43 secured in the tapped opening 42, and an annular seal 44 impinging on the valve body 11 to prevent gas outflow. A reset spindle 46 is translatably disposed in a spindle bore 47 extending through the housing 41. A compression spring 48 is disposed about the spindle 46 to bias the reset mechanism to translate outwardly from the valve body, and the outer portion of the spindle 46 is provided with a button end 49. The inner end of the spindle 46 includes a pin 51 extending therefrom and adapted to translate inwardly and impinge on the valve ball 33 when it is seated in the O-ring seal 28. An annular sliding seal 52 on the spindle 46 prevents gas outflow through the bore 47.

A flow path is established from the valve stem passage 17 at the inlet port 13 to the internal bore 18, past the valve ball 33 and O-ring seal 28, and thence through the sleeve passage 31 to the outlet port 26. With the valve body disposed so that the internal bore 18 extends generally upwardly from the inlet port 13 to the outlet port 26, gas flow proceeds unimpeded and operation of the gas appliance takes place in normal fashion. The valve ball 33 is quiescent within the vertically disposed medial bore portion, generally resting at the inner end of the valve stem 16.

However, if the appliance becomes upset, tipped, or overturned while gas is flowing through the shutoff valve (FIG. 4), the valve ball 33 will be urged by gravity to roll toward the O-ring seal 28. Gas flow through the bore will push the ball 28 to seat in the opening 32 of the O-ring 28, blocking the flow path completely and shutting off all gas flow through the valve. The valve ball 33 will generally remain seated in the O-ring seal as long as upstream pressure is applied, and gas flow through the valve remains blocked.

It should be emphasized that the shutoff valve will operate in the case in which the gas appliance is not in use, and an event causing upset, tipping, or inversion of the appliance creates a leak that causes gas flow through the shutoff valve. Thus the invention provides protection and safety in a wide variety of incidents and occasions.

When the upset condition is rectified, the valve may be restored to operating condition by use of the reset mechanism. With regard to FIG. 5, the outer button 49 is pushed manually against the force of the spring 48 to drive the spindle 46 inwardly. The pin 51 impinges on the valve ball 33 seated in the O-ring opening 32 and pushes the ball out of its seat in the O-ring seal 28. The ball 28 then rolls toward the valve stem 16 away from the O-ring seal, and the gas flow path through the valve is reopened and reestablished. The button 49 is released, and the spring 48 translates the spindle 46 outwardly to its quiescent position. The spring action assures that the reset mechanism cannot interfere with proper operation of the valve in an upset condition.

It is noted that the amount of tipping of the valve body from an upright orientation that is required to urge the valve ball 33 into engagement with the seal 28 is dependent upon several factors, such as the distance between the inner end of the valve stem 16 and the seal 28, the diameter of the bore 18, and the size and mass of the valve ball itself. These factors may be optimized to produce an upset sensing shutoff valve that is suitably sensitive for a wide range of portable, gas-fired appliances, including, stoves and ranges, heaters, lanterns, ovens, and the like. The size of the valve body may be scaled accordingly to the demands of the appliance or class of appliances with which it is to be used. Also, the valve shutoff action involves only one moving part, and is independent of springs and other mechanical assemblies that may age, degrade, or otherwise change over long periods of time. Likewise, the reset mechanism is optimally simple and straightforward and easy to use. These factors are significant in creating a device that is reliable, durable, sensitive, and inexpensive.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. An upset sensing gas shutoff valve for use with a portable gas appliance, including;

a valve body having an internal bore adapted to be connected between the portable gas appliance and a pressurized gas source, said internal bore extending between an inlet port and an outlet port and defining a gas flow path therebetween;

a valve ball, and means for securing said valve ball within a portion of said bore;

an annular seal secured in said bore;

said valve ball being translatable within said bore from a first position in which said internal bore extends generally upwardly and said ball is disengaged from said annular seal to a second position in which said internal bore is tilted from said generally upwardly disposition to a generally lateral disposition and said ball is seated in said annular seal to block all gas flow through said bore; and, said pressurized gas source comprising a compressed gas tank, and further including a valve stem extending from said inlet port to engage a standard tank output valve and transfer compressed gas into said internal bore.

2. The upset sensing gas shutoff valve of claim 1, wherein said means for securing said valve ball includes an inner end portion of said valve stem.

3. An upset sensing gas shutoff valve for use with a portable gas appliance, including;

a valve body having an internal bore adapted to be connected between the portable gas appliance and a pressurized gas source, said internal bore extending between an inlet port and an outlet port and defining a gas flow path therebetween;

a valve ball, and means for securing said valve ball within a portion of said bore;

an annular seal secured in said bore:

said valve ball being translatable within said bore from a first position in which said internal bore extends generally upwardly and said ball is disengaged from said annular seal to a second position in which said internal bore is tilted from said generally upwardly disposition to a generally lateral disposition and said ball is seated in said annular seal to block all gas flow through said bore; and, an internally threaded portion formed in said outlet port, and an externally threaded sleeve secured in said internally threaded portion to secure said annular seal in said internal bore.

4. The upset sensing gas shutoff valve of claim 3, wherein said annular seal comprises an O-ring seal having a central opening through which passes said gas flow path, said valve ball having a diameter greater than said central opening and adapted to be seated in said central opening in blocking engagement with respect to said gas flow path.

5. The upset sensing gas shutoff valve of claim 4, further including reset means for selectively disengaging said valve ball from said seat in said central opening of said O-ring seal.

6. The upset sensing gas shutoff valve of claim 5, wherein said reset means includes a reset bore intersecting said internal bore adjacent to said O-ring seal.

7. The upset sensing gas shutoff valve of claim 6, further including a reset spindle translatably disposed in said reset bore, and reset seal means for preventing gas outflow through said reset bore.

8. The upset sensing gas shutoff valve of claim 7, further including pin means extending from said spindle to selectively impinge on and unseat said valve ball when said spindle is translated inwardly in said reset bore.

9. The upset sensing gas shutoff valve of claim 8, further including spring means associated with said spindle to bias said spindle to translate fully outwardly in said reset bore.

10. The upset sensing gas shutoff valve of claim 9, further including a push button secured to an outer end of said spindle to facilitate manual translation of said spindle inwardly in said reset bore.

11. The upset sensing gas shutoff valve of claim 3, wherein said sleeve includes a central passage extending longitudinally therethrough and comprising a portion of said gas flow path.

12. The upset sensing gas shutoff valve of claim 3, further including means on said valve body for engaging a wrench, including a plurality of external flat surfaces arranged in a regular array.

13. An upset sensing gas shutoff valve for use with a portable gas appliance, including;

a valve body having an internal bore adapted to be connected between the portable gas appliance and a pressurized gas source, said internal bore extending between an inlet port and an outlet port and defining a gas flow path therebetween;

a valve ball, and means for securing said valve ball within a portion of said bore;

an annular seal secured in said bore;

said valve ball being translatable within said bore from a first position in which said internal bore extends generally upwardly and said ball is disengaged from said annular seal to a second position in which said internal bore is tilted from said generally upwardly disposition to a generally lateral disposition and said ball is seated in said annular seal to block all gas flow through said bore; and, an externally threaded portion of said valve body disposed concentrically about said outlet port and adapted to be connected to the portable gas appliance.

* * * * *